US012638676B2

(12) United States Patent
Huber

(10) Patent No.: US 12,638,676 B2
(45) Date of Patent: May 26, 2026

(54) HEAD UP DISPLAY APPARATUS WITH A BRIGHT ENERGY EFFICIENT BACKLIGHT FOR A VEHICLE

(71) Applicant: Bayerische Motoren Werke Aktiengesellschaft, Munich (DE)

(72) Inventor: Wolfgang-Andreas Huber, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 286 days.

(21) Appl. No.: 17/788,821

(22) PCT Filed: Dec. 16, 2020

(86) PCT No.: PCT/EP2020/086568
§ 371 (c)(1),
(2) Date: Jun. 24, 2022

(87) PCT Pub. No.: WO2021/160325
PCT Pub. Date: Aug. 19, 2021

(65) Prior Publication Data
US 2023/0041447 A1 Feb. 9, 2023

(30) Foreign Application Priority Data
Feb. 14, 2020 (DE) ..................... 10 2020 103 967.0

(51) Int. Cl.
*G02B 27/01* (2006.01)
*B60K 35/23* (2024.01)
(Continued)

(52) U.S. Cl.
CPC .......... *G02B 27/0101* (2013.01); *B60K 35/23* (2024.01); *B60K 35/81* (2024.01);
(Continued)

(58) Field of Classification Search
None
See application file for complete search history.

(56) References Cited

U.S. PATENT DOCUMENTS 5,864,432 A 1/1999 Deter
6,078,423 A * 6/2000 Orr ........................ G02B 30/26
359/462
(Continued)

FOREIGN PATENT DOCUMENTS

DE 195 40 108 C2 8/1998
DE 102 24 016 A1 12/2003
(Continued)

OTHER PUBLICATIONS

International Search Report (PCT/ISA/210) issued in PCT Application No. PCT/EP2020/086568 dated Mar. 15, 2021 with English translation (four (4) pages).
(Continued)

*Primary Examiner* — Fred Tzeng
(74) *Attorney, Agent, or Firm* — Crowell & Moring LLP

(57) ABSTRACT

A head up display apparatus for a vehicle includes an imaging unit that generates a projection light beam with display content and includes a transmissive display indication layer with selectively controllable display elements distributed over an area, a matrix backlight that provides backlighting therefor and includes selectively controllable light sources distributed along the transmissive display indication layer, and a collimation array with collimators arranged between a light source and the transmissive display indication layer, and a projection panel in the beam path of the projection light beam generated by the imaging unit for reflecting the projection light beam to a user, the projection
(Continued)

panel being arranged in the beam path such that a virtual display image is generated therebehind in the visual field of the user.

18 Claims, 5 Drawing Sheets

(51) Int. Cl.

| | |
|---|---|
| *B60K 35/81* | (2024.01) |
| *G02F 1/1335* | (2006.01) |
| *G02F 1/13357* | (2006.01) |
| *G06F 3/01* | (2006.01) |
| *G09G 3/00* | (2006.01) |
| *G09G 3/34* | (2006.01) |
| *B60K 35/21* | (2024.01) |
| *B60K 35/60* | (2024.01) |
| *B60K 35/65* | (2024.01) |

(52) U.S. Cl.
CPC ... *G02B 27/0179* (2013.01); *G02F 1/133607* (2021.01); *G02F 1/133611* (2013.01); *G06F 3/013* (2013.01); *G09G 3/002* (2013.01); *G09G 3/3426* (2013.01); *B60K 35/211* (2024.01); *B60K 35/60* (2024.01); *B60K 35/654* (2024.01); *G02B 2027/0118* (2013.01); *G02B 2027/0123* (2013.01); *G02B 2027/0187* (2013.01); *G02F 2203/01* (2013.01); *G09G 2320/0233* (2013.01); *G09G 2320/028* (2013.01); *G09G 2320/0626* (2013.01); *G09G 2354/00* (2013.01); *G09G 2358/00* (2013.01); *G09G 2380/10* (2013.01)

(56) References Cited

U.S. PATENT DOCUMENTS

| | | | | |
|---|---|---|---|---|
| 7,839,549 | B2 * | 11/2010 | Mihajlovic | G02B 30/27 |
| | | | | 359/23 |
| 9,715,117 | B2 * | 7/2017 | Meacham | G03B 21/625 |
| 10,412,376 | B2 * | 9/2019 | Du | H04N 13/398 |
| 10,600,345 | B2 * | 3/2020 | Mikayama | G09G 3/025 |
| 10,747,055 | B2 * | 8/2020 | Nakamura | G02B 27/0961 |
| 11,275,237 | B2 * | 3/2022 | Brick | G02B 19/0066 |
| 2007/0064174 | A1 * | 3/2007 | Kitamura | G03B 21/2033 |
| | | | | 349/69 |
| 2008/0143895 | A1 * | 6/2008 | Peterka | G02B 30/31 |
| | | | | 348/E13.043 |
| 2009/0213147 | A1 | 8/2009 | Sagardoyburu et al. | |
| 2011/0141107 | A1 * | 6/2011 | Stendel | H04N 13/10 |
| | | | | 345/419 |
| 2011/0216096 | A1 * | 9/2011 | Sasaki | G09G 5/10 |
| | | | | 345/690 |
| 2018/0267294 | A1 * | 9/2018 | Aschwanden | H02K 33/00 |
| 2018/0284765 | A1 * | 10/2018 | Brouwer | H04W 12/61 |
| 2019/0369392 | A1 * | 12/2019 | Matsuura | G02B 3/0068 |
| 2020/0026076 | A1 * | 1/2020 | Beckman | G06F 3/013 |
| 2020/0225470 | A1 * | 7/2020 | Miao | G02B 27/30 |
| 2021/0141241 | A1 * | 5/2021 | Allio | H04N 13/31 |
| 2021/0165226 | A1 * | 6/2021 | Ide | G02B 27/0179 |
| 2021/0260998 | A1 | 8/2021 | Huber | |
| 2021/0263311 | A1 * | 8/2021 | Huber | G02B 27/0093 |
| 2021/0271077 | A1 * | 9/2021 | Huber | B60K 35/10 |

FOREIGN PATENT DOCUMENTS

| | | | |
|---|---|---|---|
| DE | 10 2009 054 232 A1 | 5/2011 |
| DE | 10 2012 204 303 A | 9/2013 |
| DE | 10 2018 209 934 A1 | 12/2019 |
| DE | 10 2018 213 269 A1 | 2/2020 |
| WO | WO 2018/095935 A1 | 5/2018 |

OTHER PUBLICATIONS

German-language Written Opinion (PCT/ISA/237) issued in PCT Application No. PCT/EP2020/086568 dated Mar. 15, 2021 (five (5) pages).

German-language Search Report issued in German Application No. 10 2020 103 967.0 dated Nov. 20, 2020 with partial English translation (13 pages).

* cited by examiner

HEAD UP DISPLAY APPARATUS WITH A BRIGHT ENERGY EFFICIENT BACKLIGHT FOR A VEHICLE

BACKGROUND AND SUMMARY OF THE INVENTION

The invention relates to a head-up display apparatus which in particular is suitable for use in a motor vehicle or some other land vehicle, aircraft or watercraft and is configured for generating a virtual display image in the field of view of a user, in particular of a driver, by way of reflection of a projection light beam with a desired display content at a projection screen, in particular a windshield of the vehicle. The invention also relates to a vehicle equipped therewith.

Head-up display apparatuses are known in particular by the designation head-up display (HUD). In a motor vehicle, for example, a desired display content, such as information about a speed limit or other useful navigation and vehicle operation indications, in the form of a virtual display image, can thereby be superimposed on the real image of the surroundings observed by the driver in front of the vehicle. For this purpose, a head-up display apparatus of traditional design comprises a display accommodated below a top side of the instrument panel, with a suitable imaging and projection optical unit, in order to generate a projection light beam with desired display content and to direct it onto a projection screen, which can be a windshield of the motor vehicle or a combiner screen provided separately in front of that, in such a way that the projection light beam is reflected by it toward the driver in order to project the virtual display image into the driver's field of view behind the projection screen.

In the case of this type of HUD structure, however, the virtual display image covers a relatively small solid angle range (field of view) in the user's field of view which, as a rule, only reaches just as far as the horizon. Increasing the field of view is prevented by the limited installation space within the instrument panel. In particular, the known projection optical unit occupies a large amount of space in the vertical direction. In this case, the driver looks into a telescope, as it were, such that, to the driver, a close display image generated at the display in the HUD interior appears in the distance in front of the motor vehicle. Consequently, in a manner corresponding to an "opening of the telescope", only a limited solid angle range is able to be covered, which is suitable for example for static display contents in a manner similar to a combined instrument panel in a motor vehicle. By contrast, contact-analog virtual representations oriented to real objects in the surroundings in front of the vehicle, as known from augmented reality (AR), for example, are not possible outside this limited solid angle range and a distance of the virtual HUD display image that is usually fixedly defined by the imaging and projection optical unit.

Secondly, DE 10 2009 054 232 A1, for example, has disclosed a head-up display for stereoscopically displaying information in a motor vehicle, comprising image generating means for generating two different individual images intended for the two eyes of an occupant and a display unit, on which luminous spots are generable, the light beams of which are visible to the occupant as a result of mirroring at the windshield of the motor vehicle. Furthermore, in the beam path between the display unit and the windshield, deflection means such as e.g. a matrix-like arrangement of small lenses are provided, which deflect light beams from different luminous spots in different emission directions.

Moreover, pixel assignment means provide for an assignment of pixels of the individual images to luminous spots of the display unit such that the individual image intended for the left eye of the occupant is visible to the left eye and the individual image intended for the right eye of the occupant is visible to the right eye. An autostereoscopic display of this type can be particularly advantageous for a contact-analog representation of the contents since it generates virtual display images with a depth effect.

Furthermore, as a rule, head-up display apparatuses are provided with additional measures that prevent disturbing reflections of ambient light at their components, which disturbing reflections could result in the user being dazzled. For this purpose, in the case of the traditional HUD design mentioned above, for example, a cover sheet that is arranged in the top side of the instrument panel and seals the HUD toward the outside is geometrically antireflection-coated (so-called glare trap). However, antireflection techniques known therefrom are not suitable for a display arranged directly opposite the windshield in an HUD construction which, in comparison with the traditional HUD, is flatter and therefore also able to be embodied with a larger area, which construction would be suitable for AR displays, in particular.

A further problem, which comes to the fore for head-up display apparatuses in a vehicle particularly in connection with AR applications, is an increased requirement in respect of the brightness of the virtual display image of approximately 10 000 cd/m², for example, if virtual display contents are represented closer to the horizon and/or beyond the horizon level and are therefore intended to be readily visible to the user even against a bright or brightly illuminated background. Owing to the generally high reflection losses at the windshield, for this purpose an image generating display designed in a manner that is currently commercially customary for HUDs and also for consumer electronics would have to emit projection light with up to 100 000 cd/m² at the surface of the display, which is difficult to realize, however, for a display technology integrable in the vehicle, in particular a liquid crystal display (LCD), inter alia on account of a correspondingly increased cooling capacity requirement.

One approach for increasing the luminosity of an image represented by an apparatus such as an HUD, for example, is known from DE 195 40 108 C2. That document discloses an apparatus for representing a first image in a second image visible through a transparent sheet, at which light emanating from the first image is reflected and which is arranged such that the first and second images are able to be perceived by an observer at the same viewing angle. At least one light source for substantially parallel light is provided and enables the light emanating from the first image to be generated in the observer's head region as a light beam with slight expansion that is greater than the width of the head and less than 50 cm. Exemplary embodiments disclosed in DE 195 40 198 C2 are restricted firstly to a diffusing sheet or an LCD matrix subdivided into selectively controllable segments, for the illumination or backlighting of which use is made of a parallel light beam—deflectable by way of a rotatable mirror—from a single light source in the form of an LED or from three lasers with the colors red, green and blue, with parallelizing optics. As an alternative, furthermore, only a self-luminous laser diode matrix or self-luminous LED matrix controlled for image generation is specified, in the case of which the construction itself or a film with lens-like elevations already provides for the slight expansion and in front of which there is arranged merely optionally a P-polarizing filter alongside the imaging optical unit.

It is an object of the present invention to specify a head-up display apparatus which is further improved in particular with regard to the visibility and the contrast of the virtual display image and which, particularly for AR applications, can enable virtual display images to be generated in an extended viewing angle range of the user, and also a motor vehicle equipped therewith.

This object is achieved by a head-up display apparatus and a vehicle equipped therewithin according to the claimed invention.

In accordance with a first aspect, a head-up display apparatus, for example a head-up display (HUD), is provided which in particular can (but need not necessarily) also be suitable for AR (augmented reality) and other applications requiring the representation of a virtual display image in a widest possible solid angle range (field of view) in front of a user. The head-up display apparatus can be designed in particular for use in a vehicle, which can be a motor vehicle or any other land vehicle, aircraft or watercraft.

The head-up display apparatus of the type set out herein comprises an imaging unit configured for generating a projection light beam with a display content. For this purpose, the imaging unit comprises a transmissive display layer, which forms a display area by virtue of its having a plurality of selectively controllable transmissive display elements distributed (in particular substantially uniformly) in areal fashion, and also a so-called matrix backlight configured for the backlighting thereof and having a plurality of selectively controllable light sources distributed (in particular substantially uniformly in a two-dimensional irregular or regular, for example hexagonal, arrangement) along the transmissive display layer. The light sources can be in particular highly efficient light sources such as LEDs, for example white light LEDs. The transmissive display layer can be configured for example as a liquid crystal display layer (also referred to as LCD panel), that is to say that the selectively controllable display elements thereof can be liquid crystal display elements. Furthermore, the imaging unit comprises a two-dimensional collimation array having collimators arranged respectively between a light source and the transmissive display layer, which collimators can be configured in particular as collimation lenses (cf. FIG. 2a). In the case of a hexagonal arrangement of the light sources, the collimators arranged thereover can be configured as hexagonal collimation lenses in an area-covering manner, for example.

The terms "area" and "areal" are used herein very generally for a two-dimensional arrangement, distribution, surface and the like. That can involve in particular a "plane" or a "planar" geometric shape, but this is not mandatory, and the described apparatus, without any disadvantage for the optical functionality set out, can also deviate from a planar geometry in order to facilitate a large-area configuration and the integration thereof in a vehicle for example for AR applications. In other words, an "area" or "areal" configuration herein can in each case be at least regionally planar or else curved or arched. In particular, it can be adapted to a curvature of a top side of the instrument panel of a motor vehicle, for example by its being constructed in a stepped or nested manner from a plurality of smaller partial areas, such as e.g. planar display sections.

Furthermore, the head-up display apparatus comprises a projection screen arranged in the beam path of the projection light beam generated by the imaging unit, and configured for reflecting the projection light beam toward a user, in such a way that a virtual display image is generated behind the projection screen in the user's field of view during the operation of the head-up display apparatus. The projection screen can be formed in particular by a windshield of the vehicle, or a combiner screen provided specifically for this purpose and arranged in front of that, in a manner known per se. In particular, in this case the projection screen can be at least partly transparent on the rear side in order that the virtual display image can be inserted into the real environment observed by the user behind the projection screen.

In this case, each collimator of the abovementioned collimation array is configured for focusing a partial beam emanating from the associated light source in accordance with a predetermined emission characteristic for the purpose of restricting the projection light beam reflected to the user substantially to a spatial region (eyebox) predetermined for the user's eyes. Although in a simple case the predetermined emission characteristic can be identical for a plurality or even for all of the light sources of the matrix backlight, it can—particularly in the case of display and virtual display image areas extended over a large area—also vary from light source to light source in order for example to achieve as homogenous an illumination of the eyebox and/or of the virtual display image area as possible. In other words, by way of the collimation array, it is possible to realize a vector field of emission characteristics for the light sources of the matrix backlight and thus also for the associated area segments of the transmissive display layer lying thereover, which vector field is suitable for (in particular substantially homogeneous) illumination of the eyebox, and substantially also only of the eyebox (terms used herein with respect to the imaging unit such as "thereover/thereunder", "behind that/in front of that" and the like should be understood in each case in the beam propagation direction of the projection light.)

One concept of the present head-up display apparatus consists in the use of a matrix backlight composed of a plurality of light sources arranged in areal fashion, and in particular uniformly at least in sections, behind the transmissive display layer (e.g. LCD panel), in combination with the focusing of the partial beams generated by individual light sources by way of a respectively associated collimator. This construction of the imaging unit makes possible, in comparison with all known HUD apparatuses which operate without a matrix backlight and/or without collimators, with comparable energy consumption, a significantly brighter and in particular also more homogeneous backlight in the format of a "chocolate box", i.e. with a compact flat construction having a thickness of only a few centimeters, for example only approximately 3 cm, which fosters integration in a vehicle without any problems, both from a thermal standpoint and from a geometric standpoint. The construction is in particular fittable in a surface region of an instrument panel of a vehicle and laterally scalable in a simple manner, i.e. in particular also highly suitable for virtual displays close to and above the horizon and for AR applications. The reasons for this will be explained in greater detail below.

As a result of the collimation mentioned, the luminous efficiency of the backlighting in relation to the electrical energy used can be increased in particular by a factor of approximately 10. The reduced energy consumption and the reduced cooling capacity requirement associated therewith in turn make it possible to use a transmissive display layer (e.g. an LCD panel) with a large-area backlight in the form of a matrix backlight, which hitherto had only been known for liquid crystal-based flat screens for instance in consumer electronics, also for a head-up display apparatus in a vehicle, where additional problem aspects such as reflection losses at the windshield, visibility against a bright background, limited installation space and cooling possibility, etc. arise as well and can be solved synergistically by way of the present construction.

A requirement mentioned in the introduction in respect of the brightness of the virtual display image of for example approximately 10 000 cd/m$^2$ for virtual display contents against a bright or brightly illuminated background and the requirement in respect of the display brightness of approximately 100 000 cd/m$^2$, the latter requirement resulting on account of usually high reflection losses at the windshield, are achievable with the present head-up display apparatus since in order to represent a virtual display image, in contrast to the flat screens in consumer electronics, it is sufficient to illuminate the region of the eyebox of the driver or of some other user. By contrast, the brightness of commercial displays in consumer electronics is generally optimized to the widest possible viewing angles, and the stated measure "candela per square meter" relates there to light emission into an entire half-space lying over the display area. However, the collimation of the generated light into the eyebox, as used herein, reduces the quantity of light required in total by approximately a factor of 10.

An additional synergistic effect can arise with the use of a matrix backlight for an LCD panel of an AR HUD embodied with a large-area flat design (the field of view of which can extend for example from a windshield base as far as the horizon) by virtue of the fact that individual light sources in the area of the matrix backlight are selectively controllable in order to backlight only those pixels of the transmissive display layer lying thereover which are intended precisely to contribute to the virtual display image. For the operation of an AR HUD, it should be expected here precisely as a rule that objects will be inserted into the driver's field of view only very sparingly, in order not to distract the driver unnecessarily. Therefore, it should be expected that usually only a fraction of the display area will be illuminated with continuous objects. As a result, the present matrix backlight approach can reduce the electrical power consumption of an LCD-based head-up display apparatus once again by a factor of 5 to 10. Overall an energy saving by a factor of 50 to 100 compared with head-up display apparatuses having LCDs, the backlight of which is not embodied in matrix form and is embodied without collimation, would thus be possible.

In this case, the concept of the matrix backlight can be most efficient particularly when the individually switchable segments of the matrix backlight are as small as possible, for example—in an ideal case—are approximately the same size as the pixels lying thereover which are formed by the selectively controllable display elements. Furthermore, the matrix backlight concept is scalable in a simple manner laterally, i.e. along the transmissive display layer, by extending its area by further light sources and for that reason, too, can be used to increase even further the effect—brought about by collimation—for reducing the electrical power consumption as described.

A further effect with the use of a matrix backlight in an LCD-based head-up display apparatus is that as a result black image regions are representable as truly black rather than, for instance, the backlight shining through in image regions which should remain black (so-called undesired "postcard effect" in the case of HUD constructions having a backlight without selective light source control).

Since the collimation array in the present case is not arranged in the beam path of the display content generated in the display area, but rather between the matrix backlight and the transmissive display layer, the display area can have in principle independently thereof further functional layers, such as e.g. a lenticular lens array for an autostereoscopic display of the type mentioned in the introduction, which, depending on a current position of the user, generates two different 2D images for the left and right eyes of the user in order to give the user a spatial impression of the virtual display image represented.

In particular, in the case of the head-up display apparatus of the type set out herein, each light source is arranged at or close to a focal point or in or close to a focal plane of the associated optical collimator, such that the divergent partial beam emitted by the light source is collimated in accordance with the respective predetermined emission characteristic to form a largely parallel partial beam with a predetermined small aperture angle of approximately +/−5° (i.e. in total approximately 10°), for example, about a predetermined propagation direction, which can vary in particular from light source to light source. The arrangement described herein can be optimized in particular for a homogeneous brightness distribution in the eyebox by way of the optical design of the optical components thereof and in particular by way of a suitable choice of the aforementioned emission characteristic in the entire display area.

In the case of one specific configuration of the head-up display apparatus, the collimators of the collimation array can be configured to be movable relative to the light sources. In particular, here the entire collimation array can be configured such that it is laterally displaceable relative to a plane or area (not necessarily planar throughout) of the matrix backlight in which the light sources are arranged. In the case of this configuration, the head-up display apparatus furthermore comprises a control unit configured to track the collimators and thus the predetermined emission characteristic(s) of the projection light beam to a current user position ascertained for example by eye tracking, in particular to an eye position or viewing direction. This can be implemented for example by laterally displacing the entire collimation array along the matrix backlight.

In the case of this specific configuration, the movable collimation array can be designed so precisely with regard to the respective collimation angles, for example, that just a narrow strip of the eyebox is illuminated during operation, in which strip the user's eyes were actually identified by eye tracking. In this case, mechanical tracking of the positioning of the light sources relative to the collimation array can then be used to illuminate optimally again an eye position that has changed within the eyebox. For this purpose, e.g. a collimation lens array could be displaced in its entirety mechanically horizontally relative to the plane of the light sources embodied as LEDs. Consequently, the efficiency of the system could be increased again and the electrical power consumption could be reduced again.

In the case of one specific configuration as an alternative or in addition thereto, furthermore, a distance between the matrix backlight and the collimation array in the beam propagation direction of the projection light can be mechanically adjustable for the purpose of changing the predetermined emission characteristic(s), i.e. primarily the collimation effect or the focusing. The head-up display apparatus can thus be operated in different operating states: for example can be visible to all the vehicle occupants by a wide emission characteristic being set, i.e. light that is not very collimated being generated, or else can be visible only to one occupant by a suitable narrow emission characteristic being set. The aforementioned distance adjustment can be implemented in particular in an at least partly automated manner by way of a suitable control unit for controlling suitable electromechanical adjusting drives of the imaging unit.

In particular, it is possible in this case to enable switching between a private mode provided for a single user, in which only a spatial region (single-user eyebox) provided for the user's eyes is illuminated, and a shared mode provided for a plurality of users, for example for a driver and a passenger or for a plurality of passengers of the vehicle, in which a spatial region (multi-user eyebox) provided for eyes of the plurality of users is illuminated. The alignment of the projection light beam solely with the eyebox of the driver or of some other individual user can be used so that other vehicle occupants are not dazzled by the projection light and/or cannot view the display contents represented (so-called privacy feature).

In the case of one specific configuration of the head-up display apparatus, the light sources of the matrix backlight can be configured to be dimmable independently of one another. This can be implemented for example by the use of potentiometers and/or by temporal pulsing with a suitable ratio of bright and dark times Vhd within a period not discernible as an individual image by the human eye, of e.g. typically $\tau < 20$ ms. In the case of this configuration, the head-up display apparatus furthermore comprises a control unit configured to dim the light sources of the matrix backlight independently of one another in accordance with a predetermined correction function H1(x,y), where (x,y) can be for example Cartesian coordinates in the display area, for increasing a brightness homogeneity in the virtual display image and/or for situation-dictated brightness adaptation of the matrix backlight in the area thereof.

By way of example, individual regions in the virtual display image which correspond to the respective location (x,y) of the display area can thus be illuminated by way of a suitable correction function H1(x,y) such that a homogeneity is ensured over the entire virtual display image. The correction function H1(x,y), in particular Vhd(x,y), can adapt the dimming of individual light sources for example such that a possible granularity is compensated for and a homogeneous virtual display image arises. A granularity here is that partial area of the display area which is illuminated by an individual light source, e.g. the individual white light LED.

The aforementioned dimming of individual light sources of the matrix backlight makes it possible for example to compensate even for inhomogeneities in the virtual display image which arise on a relatively large spatial scale, e.g. by virtue of the reflectivity of the windshield changing. This concept can also be used for the purpose that a region of the windshield which is used as a projection screen and in which the reflection of the projection light beam toward the user arises is covered with a black background for instance in accordance with a transmission profile required for other reasons, e.g. nontransparent at the bottom, increasingly more transparent toward the top, in order to ensure legal stipulations for the transmission up to prescribed lines of sight. This can be used for extending the field of view able to be covered by the head-up display apparatus in a vehicle into basically all regions of the windshield while maintaining high representation quality and visibility of the virtual display image for the user.

In the case of one specific configuration of the head-up display apparatus, the imaging unit can furthermore have optical diffusers for increasing a brightness homogeneity in the virtual display image, which in each case can be arranged in the beam path of the partial beam of a light source, in particular symmetrically about the propagation direction of the partial beam, between the light source and the associated collimator and/or between the collimator and the transmissive display layer. A diffuser can be configured in particular in circular or ring-shaped fashion around the respective propagation direction of the partial beam. By way of example, respectively one ring-shaped diffuser per one light source (e.g. one LED) can be provided symmetrically in relation to the light propagation direction between the light source and a collimator configured e.g. as a hexagonal lens and/or between the collimator and the transmissive display layer in order to optimize the homogeneity of the beam by a portion of light being diffused out of area regions having too much light, for example. For this purpose, the respective diffuser can be designed as necessary such that the diffusion property has an optimized function over the location (e.g. a radial function in relation to the respective propagation direction of the partial beam of a light source).

Possible inhomogeneities in the brightness of the virtual display image from the perspective of the eyebox that still occur despite the measures taken above can be compensated for by way of a further correction function H2(x,y), by measuring for example an inhomogeneity of an optical test image (e.g. completely white) on the display surface. From that it is possible to ascertain a function H* such as e.g. a brightness over the coordinates (x,y) of the display pixels. In the case of optimum homogeneity of the matrix backlight including the introduced diffusers, if appropriate, H*(x,y) always has approximately the same value. If, in the case of inhomogeneities remaining in the virtual display image, the values of H*(x,y) do not fluctuate to an excessively great extent, i.e. lie in a predetermined fluctuation range that is able to be compensated for by the application of the correction function H2(x,y), the function H2(x,y) can be used in this way to correct the brightness of an arbitrary image that is intended to be represented on the display by way of excessively bright points in the brightness being matched to the darker regions by suitable dimming of the display pixels, with the result that the image appears homogeneous again to the observer. This correction on the basis of the correction function H2(x,y) can in particular be implemented in the context of the image data generation, e.g. during rendering, by way of suitable software algorithms and proceed during operation. The brighter regions can thus be reduced individually and with pixel accuracy in every image situation to the brightness value of less brightly backlit pixels. In this case, it is also possible to include in the programming exceptional situations which depart from this procedure and where the full brightness potential of the backlight is needed, such as e.g. in the case of glare from the front as a result of reflection of the sun on a roadway that is wet from rain. In this case, the homogeneity correction can be situationally canceled or raised step by step, such that although the image appears inhomogeneous with regard to the brightness, the brightest regions of the display area are luminous as brightly as possible. If necessary, the function H2(x,y) can also be ascertained and applied specifically for the individual primary colors r/g/b.

In accordance with one embodiment, the head-up display apparatus furthermore has a reflection-suppressing arrangement arranged on the imaging unit, in particular directly on the latter's surface formed by the transmissive display layer together with the latter's possible functional and protective layers (such as e.g. a lenticular lens array of an autostereoscopic display). In one specific embodiment, this reflection-suppressing arrangement is configured as a deflection arrangement with one or more planar reflection areas extending along the transmissive display layer at a predetermined acute angle thereto. In this case, the reflection areas are configured and arranged for directing the projection light beam generated by the imaging unit onto the projection screen for the purpose of generating the virtual display image behind the projection screen in the user's field of view. In addition, the reflection areas are configured to be light-absorbing, in particular over the whole area, on their rear sides for suppression of disturbing reflections.

The plurality of mutually parallel reflection areas of the reflection-suppressing deflection arrangement can be configured identically among one another or else differ from one another in terms of their shape or size. Depending on their shape and size, their distance from one another in a direction perpendicular to their direction of extent can be chosen in such a way as to ensure a virtually complete suppression of disturbing reflections and a substantially loss-free and shape-maintaining deflection of the projection light beam. Some examples of this are specified further below. In principle, any (sun)light-absorbing coating, for example a matt black layer, is suitable for the rear sides of the reflection areas In contrast to the conventional type of HUD structure—mentioned in the introduction—having a projection optical unit accommodated in the interior of the instrument panel of a motor vehicle, a head-up display apparatus in accordance with this embodiment has a significantly flatter construction and can for example be installed with an installation depth of only a few cm in a top side of the instrument panel or be mounted thereon subsequently. This makes possible a significant extension of the field of view of the head-up display apparatus, for example also vertically significantly beyond the horizon, which is suitable in particular for contact-analog representations for the driver and other occupants for the purpose of supporting navigation or during autonomous driving and/or for multi-user operation with a plurality of users simultaneously. In particular, a contact-analog AR display and, with an autostereoscopic imaging unit, a truly contact-analog 3D effect (stereo augmented reality) are thus possible.

As illustrated in FIGS. 4*a* to 5*b* on the basis of a simple model example in accordance with the German patent application DE 10 2018 209 934 A1, in the case of this embodiment in the display area formed by the transmissive display layer, under each reflection area parallel to the latter there extends a strip whose pixels are visible to the user of the head-up display apparatus as a result of the deflection of the projection light at the reflection area. Lying between such visible display strips are strips which are invisible to the user of the head-up display apparatus and which cannot contribute to the generation of the virtual display image.

In accordance with one development of the above embodiment of the head-up display apparatus, the areal transmissive display layer therefore has display elements only in such mutually spaced apart strips (i.e. strip-shaped area segments of the display area) which are assigned to the individual reflection areas of the reflection-suppressing deflection arrangement and from which emanating projection light is incident on the reflection areas and is therefore subject to the deflection by the reflection-suppressing deflection arrangement. Alternatively or additionally, in this case, the areal matrix backlight can have light sources only in such mutually spaced apart strips (i.e. strip-shaped area segments of the backlight area) assigned to the individual reflection areas of the reflection-suppressing deflection arrangement, from which strips emanating projection light is incident on the reflection areas after passing through the transmissive display layer and is therefore subject to the deflection by the reflection-suppressing deflection arrangement.

In addition or as an alternative to the reflection areas mentioned, it is possible to introduce further optical deflecting elements in the beam path between display surface and projection screen, which have the effect that a portion of the pixels (display elements) of the display surface cannot contribute to the virtual display image. In this case, too, the matrix backlight incl. collimators can be configured such that those partial sections of the display area which cannot contribute to the virtual display image are not backlit, or only those pixels which can contribute to the virtual display image are homogeneously backlit.

In accordance with one development of the above embodiment as an alternative or in addition thereto, at least one of the reflection areas of the reflection-suppressing deflection arrangement is formed by a lateral surface side of a prism arranged on the imaging unit. In particular, the prism can have a triangular, quadrilateral, for example trapezoidal, or pentagonal cross-sectional area in a direction perpendicular to the direction of extent of the reflection area, such that its other lateral surface side forms a prism base, which bears on the display area formed by the transmissive display layer or on the possible further functional and protective layers (for instance lenticular lens array) thereof or extends along the latter, while the third lateral surface side of the prism serves as a light exit area for the deflected projection light beam. Such a prism can impart a high mechanical stability, in particular, to the respective reflection area.

The prism can be produced from any material that is transparent to the projection light used, in particular from glass or plastic. In the case of an air layer between the reflection area and the light-absorbing rear side thereof, the reflection can occur as a result of total internal reflection of the projection light beam coupled into the prism at the aforementioned lateral surface side of the prism; otherwise, a reflective layer, for example composed of metal, can be applied thereon and a light-absorbing layer can be applied on this reflective layer.

Furthermore, by way of example, by chamfering or rounding free-standing upper prism edges relative to the display area, it is possible to prevent a risk of injury for a user at the associated reflection area edges. The chamfered or rounded upper edges of the prisms can in particular likewise be configured to be light-absorbing, for example in a manner similar to the rear sides of the reflection areas.

The concept—described furtherabove—of a local brightness adaptation in the virtual display image by way of the correction function H1(x,y) or H2(x,y) for the brightness or suitable dimming of the matrix backlight or of the display area can also be used to eliminate possible slight inhomogeneities of the brightness in the virtual display image that may arise during the deflection of the projection light beam at the transitions between in each case two reflection areas or prisms.

In accordance with a further aspect, a vehicle, in particular a motor vehicle or any other land vehicle, aircraft or watercraft, is provided. The vehicle comprises a windshield and an instrument panel arranged thereunder. Furthermore, the vehicle comprises a head-up display apparatus of the type set out herein, whose imaging unit or reflection-suppressing arrangement arranged thereon is arranged on or in a top side—facing the windshield—of the instrument panel, in particular in a manner aligned or terminating flush with the latter. The windshield forms the projection screen of the head-up display apparatus, such that a virtual display image can be inserted into the field of view of a vehicle occupant, in particular of a driver, as the latter looks through the windshield. The terms used herein for a head-up display apparatus in a vehicle such as "thereunder", "thereover", "vertical", "horizontal", "longitudinal", "transverse" and the like—unless explained otherwise—are understood in relation to the customary vehicle coordinates.

The above aspects of the invention and the embodiments and specific configurations thereof are explained in greater detail below on the basis of the examples illustrated in the accompanying drawings. The drawings are purely schematic; in particular, they should not be interpreted as true to scale. Identical reference signs therein denote identical elements or elements which correspond to one another in terms of their function.

BRIEF DESCRIPTION OF THE DRAWINGS

FIG. 1b shows, in a schematic side view, an enlarged detail of a display area with, arranged thereon, a reflection-suppressing deflection arrangement of the head-up display apparatus from FIG. 1a.

FIG. 2b shows, in a plan view, a hexagonal areal arrangement of individual light sources of a matrix backlight in the imaging unit in accordance with FIG. 2a.

FIG. 3 shows, in a perspective view, an imaging unit of a further head-up display apparatus of the type set out herein with an example of the prism structure with a varying prism base, as an alternative to FIG. 1a.

DETAILED DESCRIPTION OF THE DRAWINGS

All embodiments, variants and specific configuration features mentioned furtherabove in the description and in the claims hereinafter for the head-up display apparatus and the vehicle in accordance with the above aspects of the invention can be implemented in the examples shown in FIGS. 1a to 5b. Therefore, they are not all repeated again below. The same correspondingly applies to the definitions of terms and effects already specified furtherabove in relation to individual features shown in FIGS. 1a to 5b.

Figure 1A:
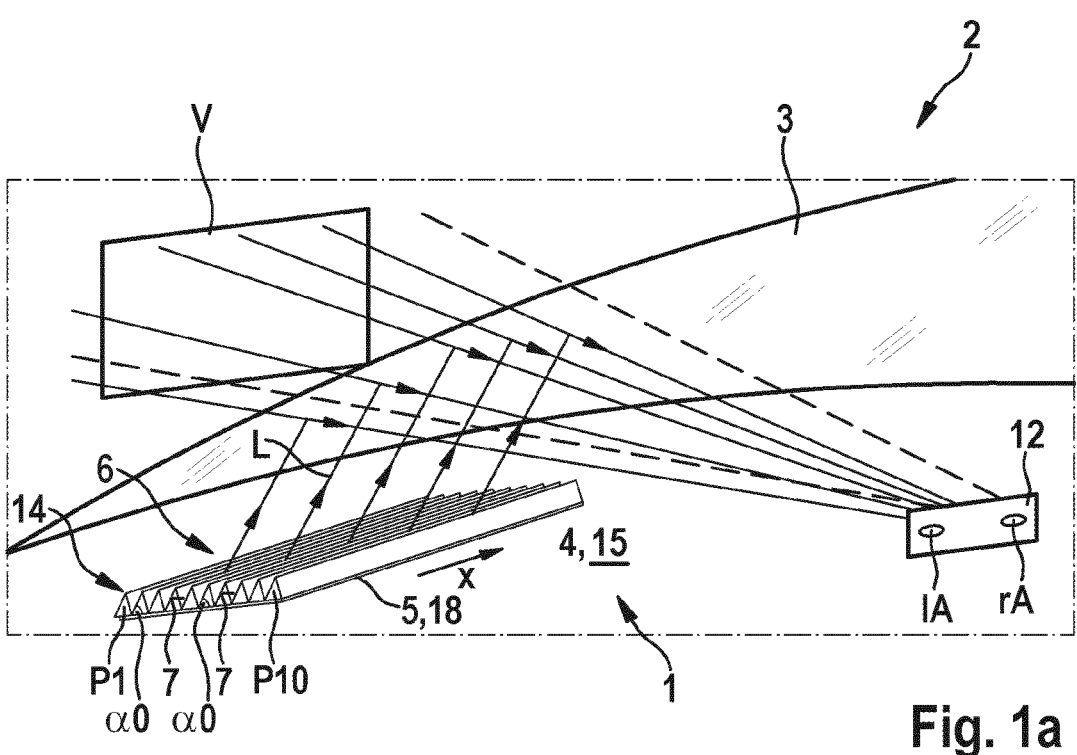
FIG. 1a shows a perspective view of a head-up display apparatus of the type set out herein in a motor vehicle, with an unvarying prism base in the prism structure of this apparatus for suppressing reflections.

FIG. 1a shows in a greatly simplified manner, in a schematic perspective view, one example of a head-up display apparatus 1 of the type set out herein, which in this example is installed as a head-up display (HUD) in a vehicle 2, of which only a windshield 3 and an instrument panel 4 arranged thereunder are indicated in FIG. 1a. In this example, a motor vehicle is involved, and the head-up display apparatus 1 is configured to insert a virtual display image V into the field of view of a driver or of some other occupant as the latter looks through the windshield 3, which serves as a projection screen of the head-up display apparatus 1, which projection screen is reflective on the side of the user and largely transparent on the rear side.

The heart of the head-up display apparatus 1 is the latter's imaging unit 16 (illustrated in greater detail in FIGS. 2a-2b), which generates a projection light beam L with a desired display content during operation and of which only a transmissive display layer (e.g. LCD panel) forming a display area 5 is illustrated in FIG. 1a, for the sake of clarity. Purely by way of example, in FIG. 1a, the display area is configured in a manner known per se to form an autostereoscopic display and for this purpose comprises a lenticular lens array (not illustrated) arranged on the transmissive display layer. Furthermore, for this purpose, a control algorithm is implemented in a display control unit (not illustrated), which control algorithm, on the basis of a current user position that is able to be ascertained by eye tracking, conditions the display content fed in as a side-by-side display image composed of two slightly different 2D images interleaved in one another in such a way that in each case only one of these 2D images is directed to the left eye lA and respectively the right eye rA of the user by way of the lenticular lens array in order that the user can perceive the virtual display image V with a 3D effect.

Furthermore, the imaging unit comprises a backlight for the LCD panel, which backlight is not illustrated in FIG. 1a and is configured as a matrix backlight and will be described further below with reference to FIGS. 2a and 2b.

In this example, a reflection-suppressing deflection arrangement 6 in the form of a prism structure composed of glass or plastic is fitted on the display area 5 for the reflection-free integration thereof into the vehicle 2. In this example, this deflection arrangement comprises purely by way of example ten prisms P1 to P10 which bear on the display area 5 and whose internally reflectively coated lateral surfaces form planar reflection areas 7, which extend along the display area 5 at a predetermined acute angle $\alpha0$ thereto and parallel to one another and on their rear sides 14 are configured to be light-absorbing over the whole area for the purpose of suppressing disturbing reflections.

Figure 1B:
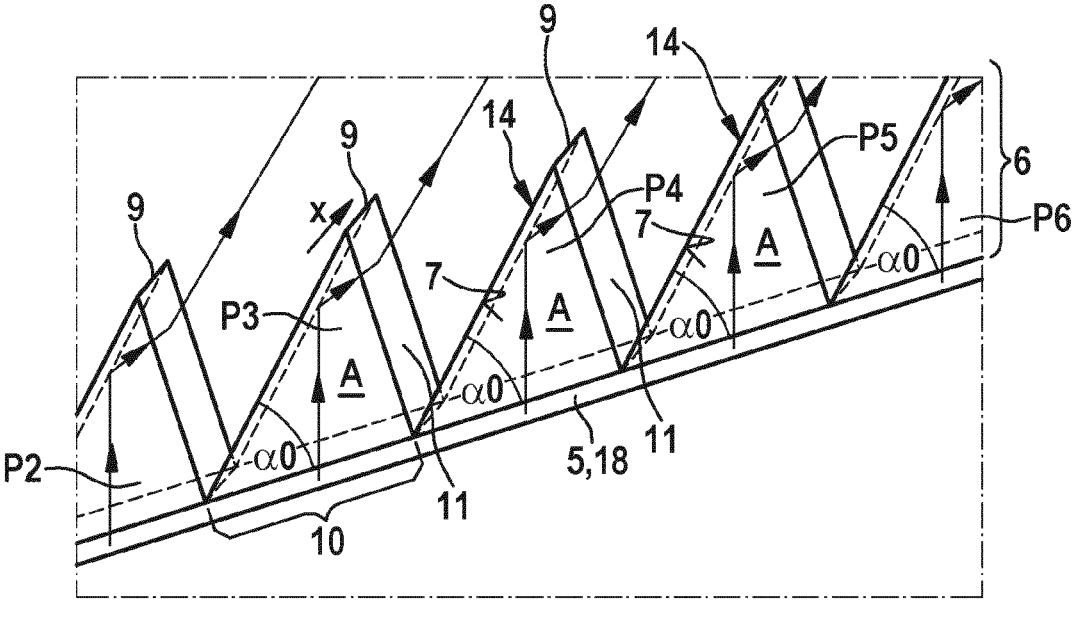

FIG. 1b shows an enlarged detail of the display area 5 and of the reflection-suppressing deflection arrangement 6—arranged thereon—of the head-up display apparatus 1 in accordance with FIG. 1a in a schematic side view. This enlarged detail illustrates, inter alia, the deflection of the projection light beam L generated by the display area 5 at the reflection areas 7 formed by the prism structure. In this case, for the beam path in the prism structure it should be noted that emission angles of the projection light which lead into the eyebox 12 are generally not perpendicular to the display area 5 and in particular can also vary along the display area 5 in order to obtain a homogeneous illumination of the eyebox 12.

As a result of the projection light beam L being deflected at the reflection areas 7, it is projected onto the windshield 3 of the vehicle 2 and reflected by the windshield to the eyes of a user (cf. eyebox 12 in FIG. 1a), in particular of a driver or passenger (indicated by arrows). This is designed such that a virtual display image V inserted into the user's field of view arises behind the windshield 3 and, for the user, is superposed with a real environment observed through the windshield 3 in front of the vehicle 2. For this purpose, the predetermined acute setting angle $\alpha0$ of the reflection areas 7 can be defined in an application-specific manner for example from the mutual geometric arrangement of the display area 5, of the windshield 3 and of the eyebox 12, i.e.

of that spatial region in the vehicle interior from which the virtual display image V is intended to be visible.

In the case of the geometric arrangement of the reflection areas 7 as shown in FIG. 1*a*, their light-absorbing rear sides 14 make it possible to achieve in particular an almost complete suppression of disturbing reflections of the ambient light from arbitrary directions from outside and inside the vehicle 2 in the direction of the eyebox 12.

In this example, purely by way of example all the reflection areas 7 of the reflection-suppressing deflection arrangement 6 are formed by the internally reflectively coated lateral surface sides of prisms Pn=P1, P2, . . . , P10 composed of glass or plastic that bear on the display area 5. In this case, each prism Pn has a triangular cross-sectional area A in a direction perpendicular to the direction x of extent of the respective reflection area 7, such that the other lateral surface side of the prism forms a prism base 10 bearing on the areal pixel arrangement 5, while the third lateral surface side of the prism serves as a light exit area 11 for the deflected projection light beam L. This can in particular result in a particularly robust construction of the head-up display apparatus 1 and protect both the display area 5 and the reflection areas 7 against possible damage and the user against possible injuries at the free-standing edges thereof. In particular, upper prism edges 9 can additionally be rounded or chamfered for this purpose. In FIG. 1*a*, the lateral surface sides bearing on the autostereoscopic display area 5, i.e. prism bases 10, of the prisms Pn are directly adjacent to one another, purely by way of example. This is not mandatory, however, since even trapezoidal cross-sectional areas A of the prisms Pn, in the case of which prism edges lying opposite the reflection areas 7 are cut off, are just as well suited to the described functionality of the head-up display apparatus 1.

The head-up display apparatus 1 can be mounted for example in or on a top side 15 of the instrument panel 4 (not illustrated in more specific detail in FIG. 1*a*) of the vehicle 2. In this case, for example, the display area 5 or the reflection-suppressing deflection arrangement 6 can be arranged, at least in sections, substantially flush with the top side 15 of the instrument panel 4, which can be particularly inconspicuous, protective for the optical components or the user and/or space-saving.

Figure 2A:
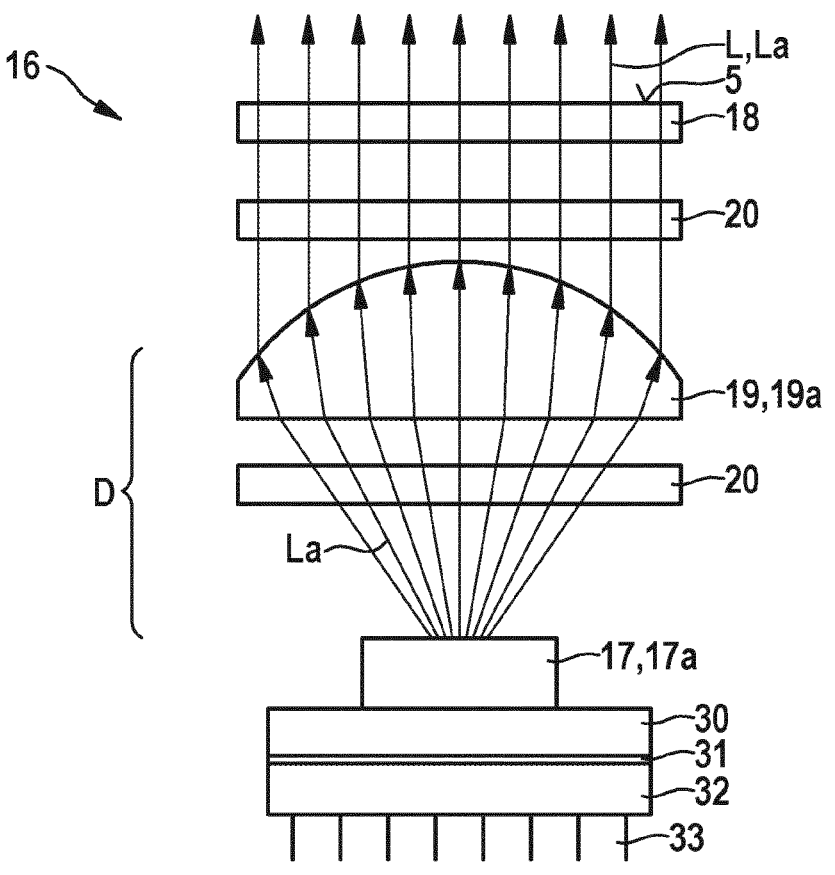
FIG. 2a shows, in a schematic basic illustration, the optical set-up of an imaging unit of a head-up display apparatus of the type set out herein.

FIG. 2*a* shows, in a schematic basic illustration, the optical set-up of the imaging unit 16 of the head-up display apparatus 1, which for the rest can be configured in accordance with FIGS. 1*a*-1*b*, for example. The basic illustration shows individual optical components of the imaging unit 16 and the function thereof on the basis of the example of a partial beam La of the projection light beam L which emanates from one of the numerous light sources 17*a* of a matrix backlight 17 for backlighting the transmissive display layer 18 (LCD panel) forming a display area 5 of the imaging unit 16. The transmissive display layer 18 can be protected in particular by a suitable protective layer (not illustrated) for very intense illumination during operation from below in FIG. 2*a*.

Figure 2B:
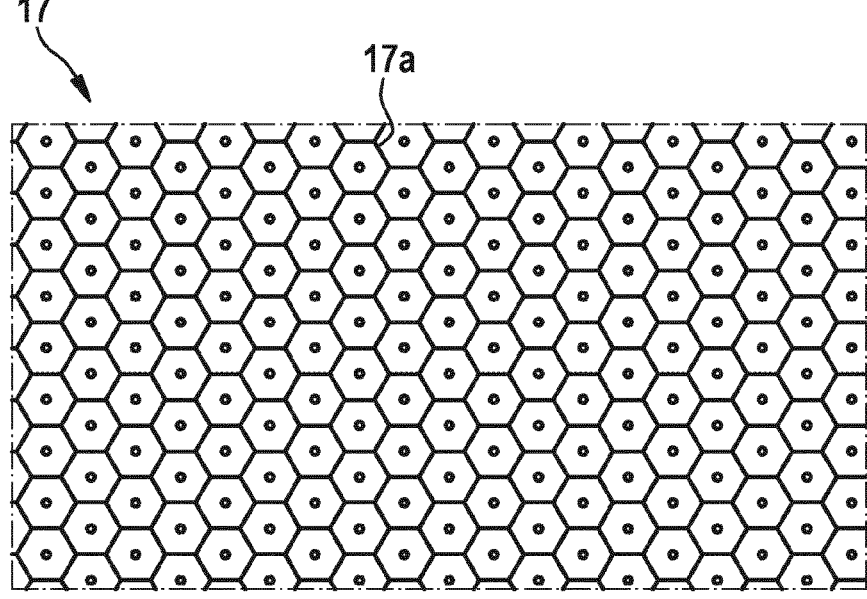

The matrix backlight 17 can comprise for example a circuit board 30 having light sources 17*a* in the form of individual LED chips with suitable matrix control, the light sources being distributed regularly in the area of the circuit board in a hexagonal arrangement in accordance with FIG. 2*b* (which shows the matrix backlight 17 in plan view). In particular, highly efficient white light LEDs can be involved here, while the coloration can be implemented as necessary in overlying display elements (not specifically illustrated) of the transmissive display layer 18. Purely by way of example, FIG. 2*a* furthermore schematically indicates a suitable thermal contacting 31, a housing base 32 and suitable cooling 33 (indicated schematically by a plurality of cooling fins purely by way of example here) for the matrix backlight 17.

Furthermore, the imaging unit 16 comprises a two-dimensional collimation array 19 having collimators 19*a* arranged respectively between a light source 17*a* and the transmissive display layer 18, the collimators being configured as collimation lenses in this example. In the case of a hexagonal arrangement of the light sources 17*a*, the collimators 19*a* arranged thereover can be configured as hexagonal collimation lenses in an area-covering manner, for example. In this example, the light source 17*a* is arranged at a mechanically variable distance D in the beam propagation direction of the partial beam La from the collimator 19*a* lying thereover, which distance can correspond to the focal length f of the collimator, for example, in order to obtain a completely collimated partial beam La. In the individual case, the divergent partial beam La emitted by each light source 17*a* is collimated in accordance with the respectively suitable predetermined emission characteristic to form a largely parallel partial beam La with a predetermined small aperture angle of approximately +/−5° (i.e. in total approximately 10°), for example, around a suitable predetermined propagation direction, which can vary in particular from light source to light source along the area of the matrix backlight 17. As shown in FIG. 2*a*, here the individual emission characteristics or the propagation directions of the partial beams La for illuminating the eyebox 12 can deviate from a perpendicular alignment in relation to the display area 5.

Furthermore, in this example, in order to increase the light homogeneity in the display area 5 or in the eyebox 12 or in the virtual display image V (cf. FIG. 1*a*), optical diffusers 20 of the type mentioned furtherabove, here for example having a radially symmetrical transmission function around the propagation direction of the partial beam La, are arranged in the beam path between the light source 17*a* and the collimator 19*a* and/or between the collimator 19*a* and the transmissive display layer 18.

With the aid of the optical set-up of the imaging unit 16 with collimators 19*a* and diffusers 20 provided between the matrix backlight 17 and the transmissive display layer 18, as shown in FIG. 2*a*, it is possible to generate in the display area 5 a vector field of suitable emission characteristics for the projection light in order that the projection light beam L reflected from the windshield 3 to the user is restricted to the region of the eyebox 12 and the latter is also illuminated as homogeneously as possible. The emission characteristic optimized for this purpose can be optimized by way of the optical design of the overall system of the head-up display apparatus 1, i.e. taking account of the reflections at the prisms Pn and at the windshield 3.

Figure 3:
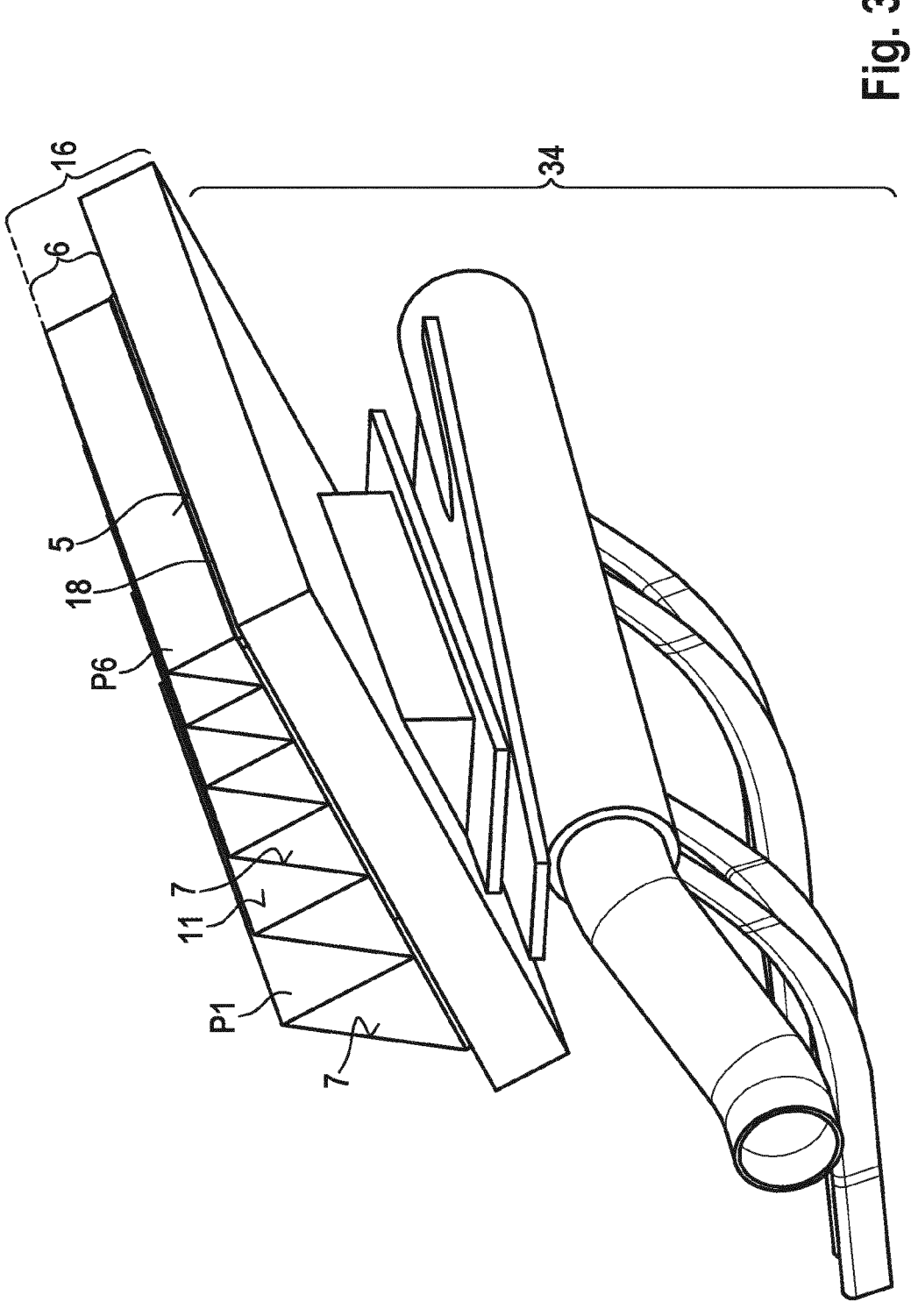

FIG. 3 shows, in a schematic perspective illustration, an imaging unit 16 of a head-up display apparatus 1 of the type set out herein with an example of the reflection-suppressing deflection arrangement 6 as an alternative to FIG. 1*a*, the prism structure of which deflection arrangement comprises in total not ten but rather six prisms Pn=P1, P2, . . . , P6 having a triangular cross-sectional area A of a different size in each case. In FIG. 3, the prism bases 10, prism heights and thus also heights of the reflection areas 7 increase progressively for example in the direction toward the windshield 3. As a result, upper prism edges 9 can be aligned with a line leading to the user's eyes even in the case where a section of the top side 15 of the instrument panel of the vehicle 2 is inclined with respect to the windshield 3 to a greater extent in comparison with FIG. 1*a*, for example. Alignment of upper prism edges 9 with a line leading to the user's eyes when the head-up display apparatus 1 is integrated into the vehicle 2 makes it possible to achieve for example invisibility of the light exit areas 11 of the reflection-suppressing deflection arrangement 6 for the user. For the rest, what is applicable to the head-up display apparatus 1 having a reflection-suppressing deflection arrangement 6 in accordance with FIG. 3 is the same as what is applicable to FIG. 1a.

As illustrated in FIG. 3, the imaging unit 16 with the reflection-suppressing deflection arrangement 6 arranged thereon have overall a significantly flatter construction in comparison with the conventional type of HUD structure—mentioned in the background—having a projection optical unit accommodated in the interior of the instrument panel 4. This makes possible a significant extension of the field of view of the head-up display apparatus 1, for example also vertically significantly beyond the horizon. In particular, contact-analog representations for the driver and other occupants, in particular with a truly contact-analog 3D effect (stereo augmented reality), are thus possible. FIG. 3 shows purely by way of example one possible arrangement of the imaging unit 16 with the reflection-suppressing deflection arrangement 6 arranged thereon in the vehicle 2 (cf. FIG. 1a) above a vehicle-typical carrying structure 34 in the region of the instrument panel 4.

Figure 4A:
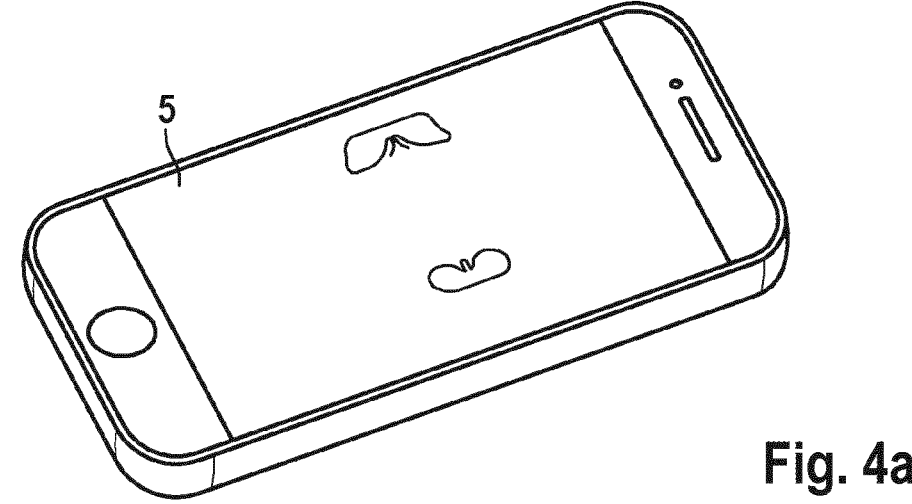
FIGS. 4a to 4c show perspective views of a model example of a head-up display apparatus of the type set out herein for elucidating the deflection effect of the reflection-suppressing deflection arrangement of this apparatus with a plurality of prisms.
Figure 4B:
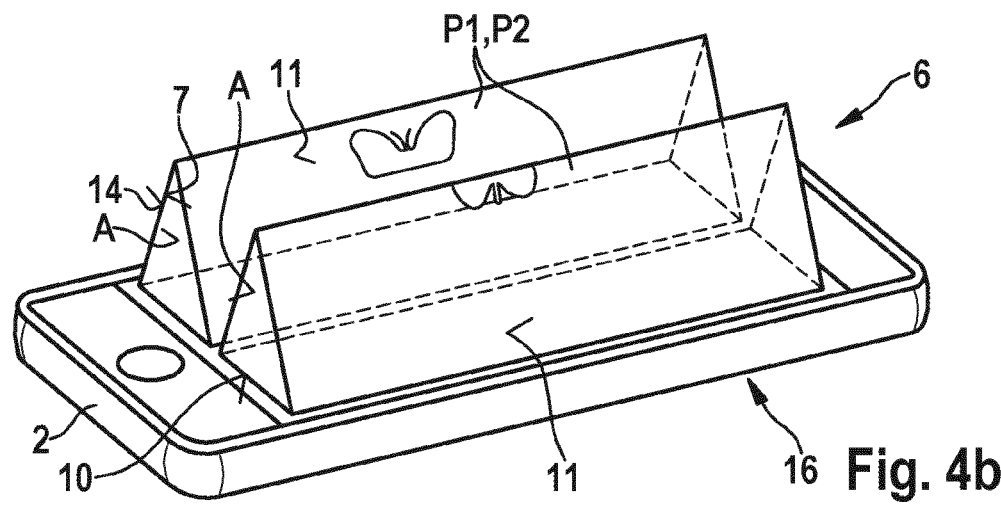
Figure 4C:
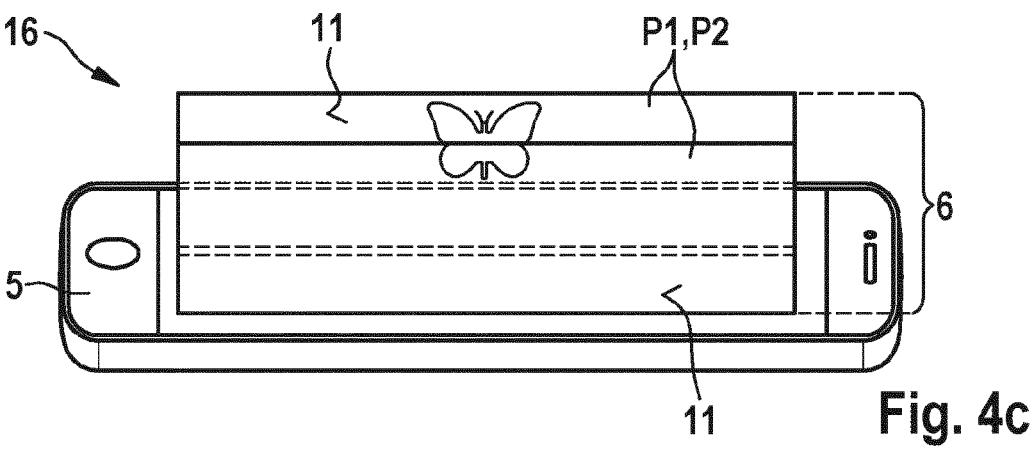

FIGS. 4a to 4c show, in each case in a perspective view, a greatly simplified model example of a head-up display apparatus 1 of the type set out herein (for example similar to FIG. 1a), or the imaging unit 16 thereof, for elucidating the deflection effect of its reflection-suppressing deflection arrangement 6, the reflection areas 7 of which in this model are formed by back lateral surface sides—facing away from the observer or user—of two prisms P1 and P2 having triangular cross-sectional areas A.

In this model example, the imaging unit 16 having a display area 5 is configured as a flat screen which generates a desired display content, in this example the two-dimensional image of a butterfly shown in FIG. 4a, the image being transported by the projection light beam L emanating from the flat screen (cf. FIG. 1a). When passing the reflection-suppressing deflection arrangement 6 arranged on the display area 5, the projection light beam L is deflected at the reflection areas 7 of the internally reflectively coated back lateral surface sides of the prisms P1 and P2 in order, for example as in FIG. 1a, to reach the windshield 3 of the motor vehicle and, after having been reflected by the windshield, to the user's eyes.

As can be seen in FIG. 4b, the projection light beam L is coupled into the prisms P1 and P2 through their prism bases 10 bearing on the display area 5 and emerges from their light exit areas 11, while the rear sides 14 of the reflection areas 7 are configured to be light-absorbing for the ambient light for the purpose of suppressing disturbing reflections. As shown in FIG. 4c, the projection light beam L coupled into the reflection-suppressing deflection arrangement 6 leaves the light exit areas 11 of the prisms substantially without loss of brightness and, in the case of suitable control of the display area 5 as in FIG. 4a, without loss of shape either.

Figure 5A:
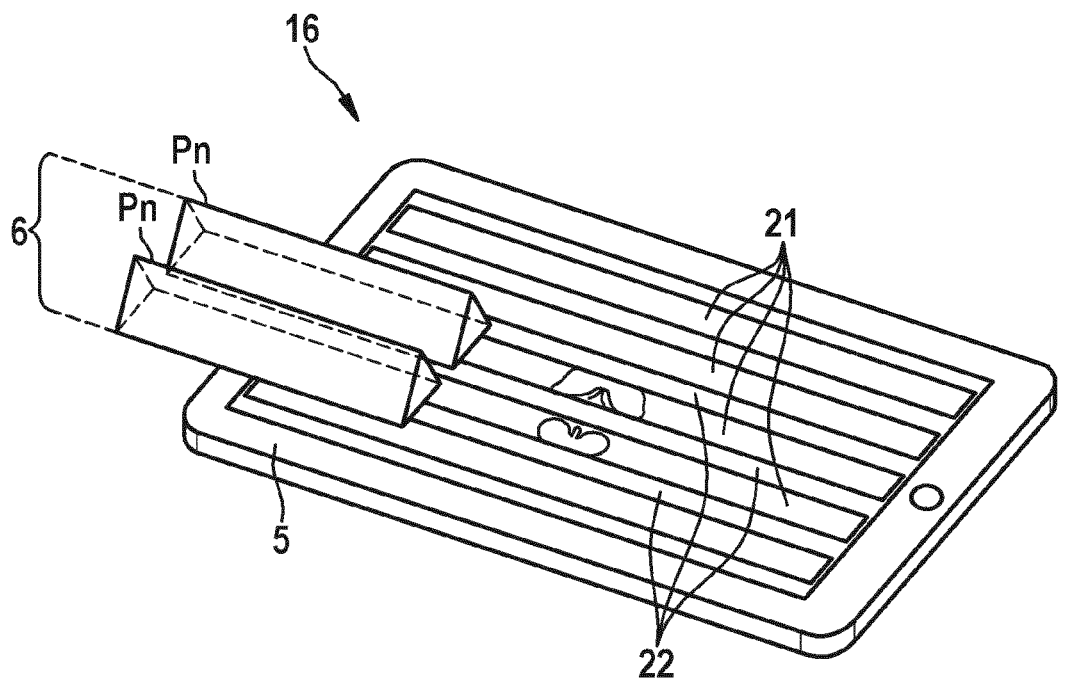
FIGS. 5a and 5b show perspective views of a further model example of a head-up display apparatus of the type set out herein for elucidating the production of visible and invisible strips in the display area of this apparatus on account of the deflection effect of the reflection-suppressing deflection arrangement thereof.
Figure 5B:
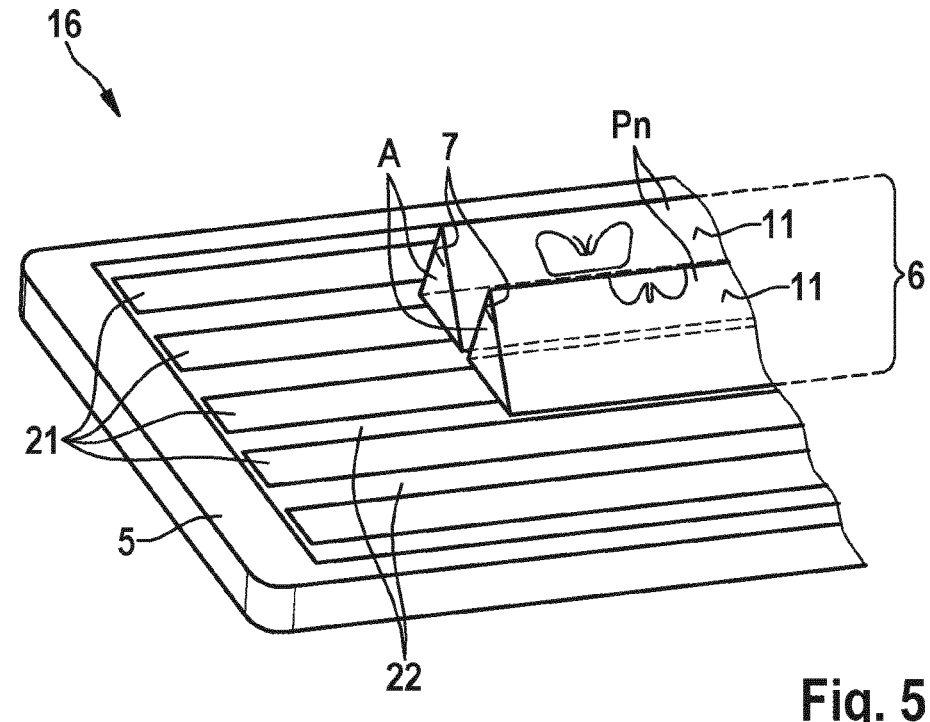

FIGS. 5a and 5b show, in each case in a perspective view, a further greatly simplified model example of a head-up display apparatus 1 of the type set out herein (for example in accordance with FIG. 1a), or the imaging unit 16 thereof, for elucidating the production of visible and invisible strips in a display area 5 when a reflection-suppressing deflection arrangement 6 of the type described herein is used. In a manner similar to that in FIGS. 4a-4c, here as well the imaging unit 16 having a display area 5 is configured as a flat screen which generates a desired display content, in this example the two-dimensional image of a butterfly shown in FIG. 5a. In this model example, the reflection-suppressing deflection arrangement 6 arranged on the display area 5, in a manner analogous to FIGS. 4b-4c, is also formed by prisms Pn bearing on the flat screen, the long sides of the prisms being adjacent to one another; for the sake of simplicity, only two of a total of five prisms P1 to P5 possible in this example are shown in this case as well.

As additionally indicated in FIGS. 5a and 5b, strips 21 extend parallel to the reflection areas 7 of the prisms Pn in the display area 5, which parallel strips can be made visible to the user of the head-up display apparatus 1 by way of the deflection of the projection light at the reflection areas 7 of here up to five identical prisms Pn=P1, . . . , P5. In between there are strips 22 that are invisible to the user of the head-up display apparatus 1.

The invisible strips 22 can therefore be left black in the display area 5.

LIST OF REFERENCE SIGNS

1 Head-up display apparatus
2 Vehicle
3 Windshield
4 Instrument panel
5 Display area
6 Reflection-suppressing deflection arrangement
7 Reflection area(s) of the reflection-suppressing deflection arrangement
9 Upper prism edge
10 Prism base
11 Light exit area
12 Eyebox
14 Light-absorbing rear side(s)
15 Top side of the instrument panel
16 Imaging unit
17 Matrix backlight
17a Individual light source of the matrix backlight
18 Transmissive display layer
19 Collimation array
19a Collimator
20 Optical diffuser
21 Visible strip
22 Invisible strip
30 Circuit board of the matrix backlight
31 Thermal contacting
32 Housing base
33 Cooling
34 Carrying structure
L Projection light beam
La Partial beam
Pn Prism No. n
V Virtual display image
x Direction of extent of the reflection area(s) or prisms
A Prism cross-sectional area perpendicular to the direction of extent
α0 Angle of inclination of a reflection area

The invention claimed is:

1. A head-up display apparatus comprising:
an imaging unit for generating a projection light beam with a display content, the imaging unit having a transmissive display layer with a plurality of selectively controllable display elements distributed in areal fashion, a matrix backlight configured for the backlighting of the transmissive display layer and having a plurality of selectively controllable light sources distributed along the transmissive display layer, and a collimation array with collimators arranged between a light source and the transmissive display layer; and a projection screen arranged in a beam path of the projection light beam generated by the imaging unit, and configured to reflect the projection light beam toward a user, such that a virtual display image is generated behind the projection screen in the user's field of view, wherein:

each collimator is configured to focus a partial beam emanating from an associated light source in accordance with a predetermined emission characteristic for restricting the projection light beam reflected to the user to a spatial region predetermined for the user's eyes, the entire collimation array is configured to be laterally displaceable relative to a plane or an area of the matrix backlight in which the light sources are arranged, the collimators are movable relative to the light sources, and the head-up display apparatus further comprises a control unit configured to track the collimators and thus predetermined emission characteristics of the projection light beam to a current user position ascertained by eye tracking to an eye position or viewing direction.

2. The head-up display apparatus according to claim 1, wherein the light sources are distributed substantially uniformly along the transmission display layer.

3. The head-up display apparatus according to claim 1, wherein each light source is arranged at or close to a focal point or in or close to a focal plane of an associated optical collimator, such that a divergent partial beam emitted by the light source is collimated to form a largely parallel partial beam with a predetermined small aperture angle of approximately +/−5°, and a propagation direction that varies from a first light source to a second light source in accordance with the respective predetermined emission characteristic.

4. The head-up display apparatus according to claim 1, wherein the eye tracking is performed by laterally displacing the collimation array along the matrix backlight.

5. The head-up display apparatus according to claim 1, wherein a distance between the matrix backlight and the collimation array in a beam propagation direction is mechanically adjustable for changing the predetermined emission characteristics, thereby switching between a private mode provided for a single user, in which only a predetermined spatial region provided for the single user's eyes is illuminated by the projection light beam, and a shared mode provided for a plurality of users, in which a predetermined spatial region provided for eyes of the plurality of users is illuminated by the projection light beam.

6. The head-up display apparatus according to claim 1, wherein:

the light sources of the matrix backlight are configured to be dimmable independently of one another, and the head-up display apparatus further comprises a first control unit configured to dim the light sources of the matrix backlight independently of one another in accordance with a first predetermined correction function for increasing a brightness homogeneity in the virtual display image and/or for situation-dictated brightness adaptation of the matrix backlight in an area, and/or the head-up display apparatus further comprises a second control unit configured, during generation of display contents to be represented, to take account of brightness values of the display elements of the transmissive display layer independently of one another in accordance with a second predetermined correction function for increasing the brightness homogeneity in the virtual display image in the area.

7. The head-up display apparatus according to claim 6, wherein the light sources of the matrix backlight are configured to be dimmable by use of potentiometers and/or by temporal pulsing with a specific ratio of bright and dark times within a period not discernible as an individual image by a human eye.

8. The head-up display apparatus according to claim 7, wherein the period is less than 20 ms.

9. The head-up display apparatus according to claim 1, wherein the imaging unit comprises optical diffusers for increasing a brightness homogeneity in the virtual display image, and the optical diffusers are arranged in a beam path of a partial beam of a light source between the light source and an associated collimator and/or between the associated collimator and the transmissive display layer.

10. The head-up display apparatus according to claim 9, wherein the optical diffusers are arranged symmetrically about a propagation direction of the partial beam.

11. The head-up display apparatus according to claim 9, wherein the optical diffusers have a radially symmetrical diffusion and/or transmission characteristic about a respective propagation direction of the partial beam.

12. The head-up display apparatus according to claim 1, further comprising:

a reflection-suppressing arrangement arranged on the imaging unit, wherein the reflection-suppressing arrangement is configurable as a deflection arrangement with one or more planar reflection areas extending along the transmissive display layer at a predetermined acute angle thereto, wherein the reflection areas are configured and arranged to direct the projection light beam onto the projection screen for generating the virtual display image behind the projection screen in the user's field of view and are configured to be light-absorbing on rear sides for suppression of disturbing reflections; and/or additional optical deflecting elements in a beam path of the projection light beam between the display area and the projection screen, such that only predetermined partial sections of the display area can contribute to the virtual display image.

13. The head-up display apparatus according to claim 12, wherein the reflection-suppressing arrangement is arranged directly on a reflection area of the imaging unit formed by the transmissive display layer.

14. The head-up display apparatus according to claim 12, wherein:

the transmissive display layer has display elements only in partial sections and/or mutually spaced apart strips assigned to the individual reflection areas of the reflection-suppressing deflection arrangement, from which strips and/or partial sections emanating projection light is incident on the projection screen as a result of deflection at the reflection areas and/or the additional optical deflecting elements, and/or the matrix backlight has light sources only in partial sections and/or mutually spaced apart strips assigned to the individual reflection areas of the reflection-suppressing deflection arrangement, from which strips and/or partial sections emanating projection light is incident on the projection screen as a result of deflection at the reflection areas and/or the additional optical deflecting elements.

15. The head-up display apparatus according to claim 12, wherein at least one of the reflection areas of the reflection-suppressing deflection arrangement is formed by a lateral surface side of a prism arranged on the imaging unit.

16. The head-up display apparatus according to claim 15, wherein the lateral surface side at the prism has a triangular, quadrilateral, trapezoidal, or pentagonal cross-sectional area.

17. The head-up display apparatus according to claim 12, wherein:

the light sources of the matrix backlight are configured to be dimmable independently of one another, and the head-up display apparatus further comprises a first control unit configured to dim the light sources of the matrix backlight independently of one another in accordance with a first predetermined correction function for increasing a brightness homogeneity in the virtual display image and/or for situation-dictated brightness adaptation of the matrix backlight in an area, and/or the head-up display apparatus further comprises a second control unit configured, during generation of display contents to be represented, to take account of brightness values of the display elements of the transmissive display layer independently of one another in accordance with a second predetermined correction function for increasing the brightness homogeneity in the virtual display image in the area, and the first control unit and/or the second control unit is configurable to increase a brightness homogeneity in image sections of the virtual display image which are deflected in an edge region of a reflection area or at a transition between individual reflection areas of the reflection-suppressing deflection arrangement.

18. A vehicle comprising:

a windshield;

an instrument panel arranged under the windshield; and the head-up display apparatus according to claim 1, wherein the projection screen is formed by the windshield and the imaging unit and/or the reflection-suppressing arrangement are arranged on or in a top side of the instrument panel, in a manner terminating flush with the latter, for inserting the virtual display image into the user's field of view as the user looks through the windshield, wherein the user is a driver of the vehicle.

* * * * *